United States Patent [19]

Dombroski et al.

[11] Patent Number: 4,593,082
[45] Date of Patent: Jun. 3, 1986

[54] PROCESS FOR PRODUCING HIGH MOLECULAR WEIGHT VINYL COPOLYMERS

[75] Inventors: John R. Dombroski; Waylon L. Jenkins, both of Kingsport, Tenn.

[73] Assignee: Eastman Kodak Company, Rochester, N.Y.

[21] Appl. No.: 759,196

[22] Filed: Jul. 26, 1985

[51] Int. Cl.$^4$ .............................................. C08F 2/24
[52] U.S. Cl. ....................... 526/216; 526/265
[58] Field of Search ............... 526/216, 225, 265

[56] References Cited

U.S. PATENT DOCUMENTS 2,862,902 12/1958 Pritchard ............................ 526/216
3,718,631 2/1973 Grosmangin ........................ 526/265

Primary Examiner—Paul R. Michl
Attorney, Agent, or Firm—John F. Stevens; William P. Heath, Jr.

[57] ABSTRACT

Disclosed is a method of producing high molecular weight copolymers from vinyl monomers such as vinylpyridine and styrene by emulsion polymerization which comprises combining the monomers with a particular surfactant, a polymerization initiator in an aqueous medium at a solids level of about 5–50% by weight, and carrying out the polymerization at a pH of about 10–14 at a temperature of about 45°–90° C. until the conversion is greater than 90%.

8 Claims, No Drawings

PROCESS FOR PRODUCING HIGH MOLECULAR WEIGHT VINYL COPOLYMERS

DESCRIPTION

1. Technical Field

This invention relates to a process which is useful for preparing high molecular weight copolymers from vinyl monomers such as vinylpyridine and styrene. The process uses emulsion polymerization techniques and provides advantages of simutaneously achieving rapid polymerization rates and high molecular weight.

2. Background of the Invention

Both styrene and vinylpyridine are well-known vinyl monomers. Styrene has been used in a wide variety of applications, and the polymerization of styrene has been studied extensively in both industrial and academic laboratories. In comparison, the commercial significance of vinylpyridine has been limited, although a wide variety of potential applications has been claimed. Copolymers with butadiene and styrene used in tire cord adhesives probably represent the largest volume application.

Recently, copolymers of 2-vinylpyridine and styrene that are predominantly 2-vinylpyridine have been found useful in rumen-protective coatings for animal feed supplements. For this application, high molecular weight polymers are required. Emulsion polymerization is generally recognized as an important process for producing high molecular weight polymers of monomers that polymerize by radical addition. However, in attempts to prepare copolymers of 2-vinylpyridine and styrene containing greater than 50% 2-vinylpyridine, difficulties have been experienced in obtaining suitable high molecular weight products. This invention provides an emulsion polymerization process for the preparation of high molecular weight copolymers of vinylpyridine and styrene containing greater than 50% vinylpyridine.

In conventional emulsion polymerization, high molecular weights are easily achieved. In the absence of chain transfer, the instantaneous number average degree of polymerization is described by the equation:

$$Xn = (N \times kp \times [M])/Ri$$

where $Xn$ is number average degree of polymerization, $N$ is number of particles, $kp$ is the rate constant for propagation $M$ is the concentration of monomer in the particles, and $Ri$ is the rate of generation of radicals. The molecular weight desired is achieved by selection of appropriate reaction conditions. Generally, in a given system, the molecular weight is controlled by selecting an appropriate temperature of polymerization and initiator concentration. These variables affect the molecular weight primarily through their effects on $Ri$. Lower temperatures and lower initiator concentrations decrease $Ri$ and increase $Xn$.

Most references to copolymerization of 2-vinylpyridine describe copolymers containing less than 50% 2-vinylpyridine in which 2-vinylpyridine is copolymerized with dienes to produce elastomers.

References of interest to the present invention include the following:

Japanese No. 13,007 (1967)—This patent discloses the emulsion copolymerization of vinylpyridines with styrene. The copolymerization is performed at pH >7.05 by addition of alkali. No polymer is formed in the absence of added alkali. An example discloses a copolymer containing 75% 2-vinylpyridine by weight. This report differs from the current invention in several important respects. First, the polymerization is carried out at an extremely low solids content (<5%). This is undesirable because it results in very poor utilization of reactor capacity. The proportion of surfactant in relation to the monomer charge (20%) is very high, and, therefore, when the polymer is isolated, a large amount of surfactant is present to contaminate the polymer. Furthermore, no mention is made of an effect of pH on I.V. Sodium lauryl sulfate is hydrolytically unstable in hot alkaline conditions such as those required for removal of monomers from the emulsion by steam distillation.

U.S. Pat. No. 3,041,243—This patent discloses a sealing coat for tablets and the like. Coatings are prepared from polymers and copolymers of vinylpyridines, including 2-vinylpyridine. The polymers which were prepared in aqueous media were polymerized in the presence of mineral acids including $H_2SO_4$ and $HCl$ with a small amount of added emulsifier (not identified). These conditions are quite different from those of the present invention.

J. E. Pritchard, M. H. Opheim, and P. H. Moyer, Industrial and Engineering Chemistry, Vol. 47, 863 (1955): This paper includes a discussion of techniques for preparation of 2-vinylpyridine polymers for use as emulsifiers in acidic media. It is mentioned that these polymers may be prepared in alkaline systems with fatty acid emulsifiers or in acidic systems in the absence of preformed emulsifiers. Copolymers are not discussed. The fatty acid emulsifier is not identified. There is no indication of molecular weights of the polymers discussed. For the intended application, it is probable that high molecular weights are not required. The systems are identified as alkaline, but no excess base is specified in the recipe. It is presumed that the alkalinity is simply that from the 2-vinylpyridine. There is no discussion of the effects of pH on the rate of polymerization or the molecular weight of the product.

L. S. Luskin in *Functional Monomers*, Vol. 2, R. H. Yocum and E. B. Nyquist, editors, Marcel Dekker, Inc., New York, 1974, pp 555-739—This general discussion of basic monomers states that homopolymers and copolymers of vinylpyridines can be readily prepared by emulsion polymerization. It is pointed out that most publications have made no mention of the effects of pH, but that the system should probably be kept alkaline when a surfactant is used. The effects of pH on molecular weight and differences in polymerization of various vinylpyridines are not discussed.

E. B. Fitzgerald and R. M. Fuoss, Industrial and Engineering Chemistry, Vol. 42, 1603, (1950): This reference discusses the bulk, bead, and emulsion polymerization of 4-vinylpyridine. Difficulties were reported in finding a suitable emulsifier. The emulsifiers used were identified only by trade name, not by structure. The authors do mention that the emulsification is highly specific. The two emulsifiers which worked were selected from over 30 that were tested. They are totally dissimilar chemically, and compounds similar to each failed to give good emulsions. Even the preferred emulsifier had to be dissolved immediately before use for the best results. The effect of pH is discussed, using initial pH values from 6.5 to 10.0. All pH values tended toward 7 during polymerization. After two hours, pH values were all between 7.0 and 7.5. The rate of polymerization was found to increase with a decrease in initial pH, in contrast to the behavior observed in the process of this invention. There appears to be some increase in reduced viscosity with initial pH, but a direct comparison is not possible since the reported sample times are different. In contrast to the present invention, insoluble polymer was produced, and the amount of insoluble polymer increased with the intiial pH. This suggests that crosslinking is occurring during the polymerization, which would explain the reported increase in reduced viscosity with time. In the process of the present invention, the polymer remains soluble at high conversions and high pH values. The results described in this paper for 4-vinylpridine are, therefore, quite different from the results we have obtained.

L. Crescenti, G. B. Gechele, and M. Pizzoli, European Polymer Journal, Vol. 1, 293 (1965)—This paper discusses the emulsion polymerization of 2-methyl-5-vinylpyridine. Sodium lauryl sulfate and sodium oleate are used as emulsifiers, and potassium persulfate is used as the initiator. No molecular weight information is given, and the effect of pH is not discussed, other than that all of the emulsions are alkaline. No excess base is added to increase the pH.

W. Gumlich, German Pat. No. 695098 (1938)—This reference describes the polymerization of vinylpyridines in broad terms, including homopolymerization and copolymerization using bulk and emulsion techniques. The 2-, 3-, and 4-vinylpyridines are claimed, but the examples refer only to vinylpyridine without making reference to specific isomers. No information is provided to indicate the molecular weights of the polymers produced. The polymerization times reported are 20 hours, two days, and 90 hours for examples in which emulsion polymerization was used.

DESCRIPTION OF THE INVENTION

The present invention provides a process for the emulsion copolymerization of vinyl monomers, particularly vinylpyridine and styrene, to a high molecular weight at a rapid rate. By "high molecular weight" it is meant that the copolymer has an I.V. greater than 1.0. By "rapid rate" it is meant that the polymerization is greater than 90% complete after about 2 hours. The importance of pH control in particular represents an important process variable which has unexpectedly been found to affect molecular weight.

According to the present invention, there is provided a method of producing a high molecular weight copolymer from vinylpyridine and styrene monomers having greater than 50 mole % repeating units from vinylpyridine by emulsion polymerization which comprises
(a) combining the monomers with about 2.5–5%, based on the weight of the monomers, of at least one surfactant selected from alkali salts of unsaturated fatty acids having 12 to 24 carbon atoms and alkyl sulfates in which the alkyl group has 8 to 20 carbon atoms, and about 0.1–3%, based on the weight of monomers, of a polymerization initiator, in an aqueous medium at a solids level of about 5–50% by weight,
(b) carrying out the emulsion polymerization at a pH of about 10–13 at a temperature of about 40°–90° C. until the conversion is greater than 90%, and
(c) isolating the polymer.

The preferred monomers to use with the process according to this invention are 2-vinylpyridine and styrene. However, 3- and 4- vinylpyridine are also useful. Also, substituted styrenes are also contemplated as useful monomers.

Useful surfactants are alkali salts of unsaturated fatty acids having 12 to 24 carbon atoms and alkyl sulfates in which the alkyl group has 8 to 20 carbon atoms.

Preferred surfactants include unsaturated fatty acid soaps. In particular, sodium oleate is preferred. Many common surfactants, including fatty acid soaps, are inoperable in our experience. For example, sodium stearate and sodium palmitate give unstable emulsions. The preferred range for the surfactant concentration is from 2.5 to 5.0% relative to the weight of monomer. Too little surfactant will not provide a good emulsion, and excessive surfactant will result in excessive foaming and contamination of the polymer after isolation.

Suitable initiators include water-soluble initiators typical of those used in emulsion polymerizations. Sodium persulfate in particular is preferred. The initiator concentration may range from 0.1 to 3.0% based on monomer weight, with the preferred range being 0.5 to 1.5%. Initiator concentrations that are too low will result in unacceptably slow reaction rates, while concentrations that are too high will produce polymer too low in molecular weight.

The polymerization is conducted in an aqueous medium at solids levels from 5 to 50%, with the preferred range from 10 to 25%. If the solids level is too low, the process will become impractical; and if the solids level is too high, the emulsion is not sufficiently stable.

The pH should be maintained between about 10 and about 14, with 11 to 13 being preferred. If the pH is lower than about 10, a low polymerization temperature is required in order to achieve a high I.V., and the rate of polymerization becomes slow and unpredictable. The unpredictable nature of the reaction under these conditions is believed to be due to increased sensitivity of the polymerization to small concentrations of unidentified impurities present in the monomer. Care must be taken not to have the pH so high that the emulsion breaks.

The temperature of polymerization for this process is dependent on the values of other process variables, but should be between 45° and 90° C. Temperatures between 45° and 70° C. are preferred. Temperatures that are too low will result in slow polymerization rates and erratic results. Temperatures that are too high will produce low molecular weight polymers.

The following examples are submitted for a better understanding of the invention.

EXAMPLE 1

Batch Polymerization at 60° C.—This example illustrates the results obtained when 2-vinylpyridine and styrene are copolymerized according to this invention. Styrene (40 g) and 2-vinylpyridine (160 g) are mixed together and washed three times with 5% NaOH (67 g) to remove inhibitors that are present in the monomers as supplied commercially. The monomer mix is then washed three times with water to remove inorganic salts and reduce the color of the monomer mix. In a separate flask, 3.87 g NaOH are added to 500 g of deaerated water. Oleic acid (6.1 g) is then added to generate sodium oleate in situ. Of the NaOH, only 0.87 g is required to react with the oleic acid. The remainder is excess. The solution is heated to 60° C. before adding the monomer mix. Sodium persulfate (1.0 g) is then added. After 18 hours, the polymer emulsion is poured into a beaker. The pH of the emulsion is 11.5. The emulsion is broken by the addition of saturated NaCl solution. The polymer particles are coalesced to produce an easily filterable product by heating to 65° C. with gentle stirring. The polymer is then collected by filtration and washed. The I.V. of the polymer is 1.02.

EXAMPLE 2

Batch Polymerization with Gradual Initiator Addition and Distilled 2-Vinylpyridine—The general procedure of Example 1 is followed, but distilled 2-vinylpyridine is mixed with styrene and used instead of extracting the monomer mix with NaOH. The $Na_2S_2O_8$ is prepared as 50 mL of a 4% aqueous solution. After the reaction mixture has reached 54° C., the initiator is added in 10 mL portions at 10-minute intervals. A mild exotherm is observed. The temperature reaches a maximum of 57.5° C. 32 minutes after the first initiator addition. The emulsion has a pH of 12.0. After isolation and washing, the polymer has an I.V. of 1.32.

EXAMPLE 3-5

Effect of pH—A series of polymerizations is performed as in Example 1, but using distilled 2-vinylpyridine. The charge includes 100 parts monomer mix, 1.25 parts $Na_2S_2O_8$, 3.5 parts Na oleate, and 500 parts water. The reactions are carried out at 43° C. For Example 3, nothing else is added. The conversion is 51% after two hours and 81% after five hours. After 24 hours, the conversion is essentially 100%, and the pH is 8.9. The I.V. of the polymer is 1.20. In Example 4, HCl (0.7 parts) is added. After 24 hours, the pH is 6.3 and no polymer is found after evaporation of water and monomers. In Example 5, NaOH (0.4 parts) is added. The conversion is 96% after two hours and essentially 100% after four hours. The pH of the emulsion is 10.3 and the polymer has an I.V. of 1.8.

EXAMPLE 6

Continuous Polymerization at High pH—A continuous emulsion polymerization is conducted in a series of three continuous stirred-tank reactors with average residence times of 3.5, 5.0, and 5.0 hours. The feed composition consists of 100 parts monomer mix (80 parts distilled 2-vinylpyridine and 20 parts styrene), 4.0 parts Na oleate, 1.25 parts NaOH, 1.25 parts $Na_2S_2O_8$, and 500 parts water. The feed is added in three streams, including a monomer feed (100 parts), an initiator feed containing 1.25 parts $Na_2S_2O_8$, (250 parts), and a surfactant feed prepared from 2.00 parts NaOH, 3.50 parts oleic acid, and 250 parts water (250 parts). The polymerization is conducted at 60° C. Conversion is high in all reactors, and the polymer has an I.V. of 1.21. The pH of the emulsion is 11.8.

EXAMPLE 7

(Control)

Continuous Polymerization without Excess NaOH—A continuous polymerization is conducted as in Example 6, but at 55° C. and without the excess NaOH. After 24 hours, the conversion is high, but the I.V. is only 0.79. The emulsion pH is 9.4.

EXAMPLE 8

(Control)

Continuous Polymerization at Low Temperature Without Excess NaOH—The polymerization is conducted in a manner similar to Example 7, but at 39° C. After 24 hours, the conversion is incomplete in the second and third reactors, and appears to be lower than in the first reactor. The conversion is apparently cycling, making the process unacceptable for commercial production. Polymer isolated from the first reactor has an I.V. of 1.14. The emulsion pH is 9.9.

EXAMPLE 9

Batch Polymerization of 65/35 Poly(2-vinylpyridine-co-styrene)—The procedure of Example 2 is followed, but using caustic-washed monomer mix containing 65 parts 2-vinylpyridine and 35 parts styrene. The reaction temperature is 60° C., the emulsion pH is 12.0, and the product has an I.V. of 1.12.

In Examples 1-6 and 9 above, the copolymers have greater than 50 mole % repeating units from vinylpyridine and the conversion is greater than 90%.

Whenever the term "inherent viscosity" (I.V.) is used in this application, it will be understood to refer to viscosity determinations made at 25° C. using 0.50 gram of polymer per 100 ml of a solvent composed of N,N-dimethylformamide.

Unless otherwise specified, all parts, percentages, ratios, etc., are by weight.

The invention has been described in detail with particular reference to preferred embodiments thereof, but it will be understood that variations and modifications can be effected within the spirit and scope of the invention.

We claim:

1. The method of producing a high molecular weight copolymer from vinylpyridine and styrene monomers having greater than 50 mole % repeating units from vinylpyridine by emulsion polymerization which comprises
   (a) combining said monomers with about 2.5-5%, based on the weight of the monomers, of a surfactant selected from the group consisting of alkali salts of unsaturated fatty acids having 12 to 24 carbon atoms and alkyl sulfates in which the alkyl group has 8 to 20 carbon atoms, and about 0.1-3%, based on the weight of monomers, of a polymerization initiator, in an aqueous medium at a solids level of about 5-50% by weight,
   (b) carrying out said emulsion polymerization at a pH of about 10-14 at a temperature of about 40°-90° C. to produce polymer with an I.V. greater than 1.0, and
   (c) isolating the polymer.

2. A method according to claim 1 wherein said polymerization is carried out for about 1.5-2.0 hours, resulting in greater than 90% completion.

3. A method according to claim 1 wherein said polymerization temperature is about 40°-70° C.

4. A method according to claim 1 wherein said surfactant is sodium oleate.

5. A method according to claim 1 wherein said initiator is sodium persulfate.

6. The method according to claim 1 wherein the solids level of said aqueous medium is about 10-25% by weight.

7. The method according to claim 1 wherein said polymerization is carried out at a pH of about 11-13.

8. The method of producing a high molecular weight copolymer from vinylpyridine and styrene monomers having greater than 50 mole % repeating units from vinylpyridine by emulsion polymerization which comprises (a) combining said monomers with about 2.5–5%, based on the weight of the monomers, of a sodium oleate and about 0.1–3%, based on the weight of monomers, of sodium persulfate, in an aqueous medium at a solids level of about 10–25% by weight,
(b) carrying out said emulsion polymerization at a pH of about 11–13 at a temperature of about 45°–70° C. to produce polymer with an I.V. greater than 1.0, and
(c) isolating the polymer.

* * * * *